US007542092B2

(12) United States Patent
Ohsawa

(10) Patent No.: US 7,542,092 B2
(45) Date of Patent: Jun. 2, 2009

(54) DIGITAL CAMERA WITH A BATTERY CHECKING DEVICE

(75) Inventor: Yutaka Ohsawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 710 days.

(21) Appl. No.: 11/091,433

(22) Filed: Mar. 29, 2005

(65) Prior Publication Data
US 2005/0219406 A1 Oct. 6, 2005

(30) Foreign Application Priority Data
Mar. 31, 2004 (JP) ............................. 2004-107071

(51) Int. Cl.
*H04N 5/225* (2006.01)
(52) U.S. Cl. .................... 348/372; 348/222.1; 348/362; 348/333.04
(58) Field of Classification Search ................ 348/372, 348/221.1, 362, 333.04
See application file for complete search history.

(56) References Cited

U.S. PATENT DOCUMENTS

| 5,594,715 A | 1/1997 | Ogasawara | |
|---|---|---|---|
| 6,070,021 A | 5/2000 | Sato | |
| 2001/0033331 A1* | 10/2001 | Eto et al. | 348/208 |
| 2002/0005907 A1* | 1/2002 | Alten | 348/333.11 |
| 2002/0008773 A1* | 1/2002 | Akizuki et al. | 348/371 |
| 2002/0012048 A1* | 1/2002 | Yamagishi | 348/207 |
| 2002/0018137 A1* | 2/2002 | Tsuda | 348/333.02 |
| 2003/0011704 A1* | 1/2003 | Sawachi | 348/372 |
| 2003/0020821 A1* | 1/2003 | Watanabe et al. | 348/312 |
| 2003/0058352 A1* | 3/2003 | Nishijima et al. | 348/231.1 |
| 2003/0063215 A1* | 4/2003 | Tsuji | 348/375 |
| 2003/0137596 A1* | 7/2003 | Kaku | 348/364 |
| 2004/0257463 A1* | 12/2004 | Goris et al. | 348/372 |
| 2005/0062878 A1* | 3/2005 | Ogawa et al. | 348/372 |

FOREIGN PATENT DOCUMENTS

| JP | 2000-115588 | 4/2000 |
|---|---|---|
| JP | 2003-244510 | 8/2003 |

OTHER PUBLICATIONS

English Language Abstract of JP 2000-115588.
English Language Abstract of JP 2003-244510.

* cited by examiner

*Primary Examiner*—Lin Ye
*Assistant Examiner*—Gevell Selby
(74) *Attorney, Agent, or Firm*—Greenblum & Bernstein, P.L.C.

(57) ABSTRACT

A digital camera includes an image pickup device which converts incident light of an object image into an electrical signal during an exposure operation; a processor which captures the electrical signal, and thereafter generates a digital image from the electrical signal; a battery checking device which performs a battery check process for determining whether a battery voltage of the digital camera is lower than a predetermined voltage level; a controller which forcibly terminates the exposure operation when the battery checking device determines that the battery voltage drops below the predetermined voltage level during the exposure operation, and subsequently makes the processor start capturing the electrical signal in order to generate a backup digital image; and a warning device which warns a user that the exposure operation is forcibly terminated due to a shortage of the battery voltage and that the backup digital image is underexposed, in the case where the exposure is forcibly terminated.

16 Claims, 9 Drawing Sheets

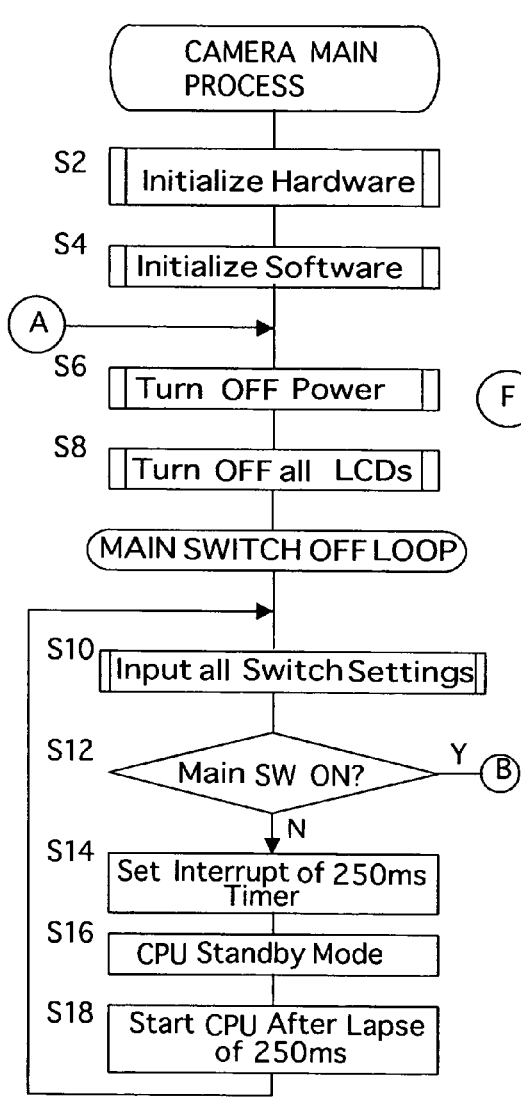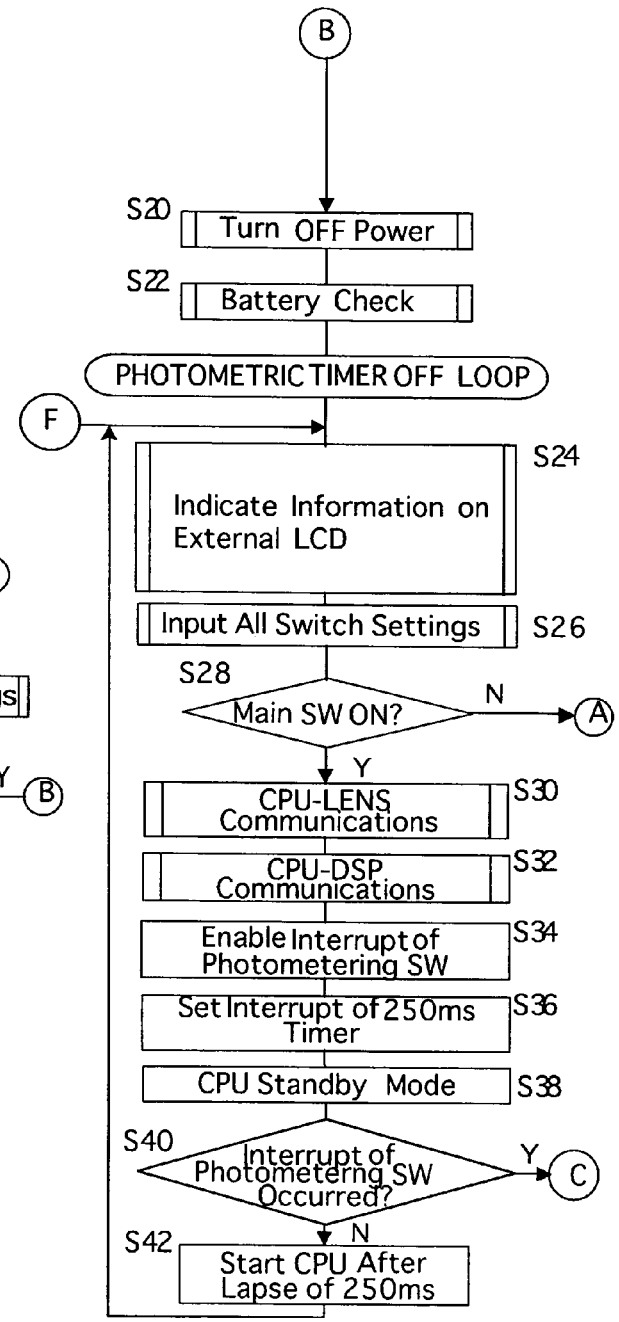
Fig. 2A
Fig. 2B

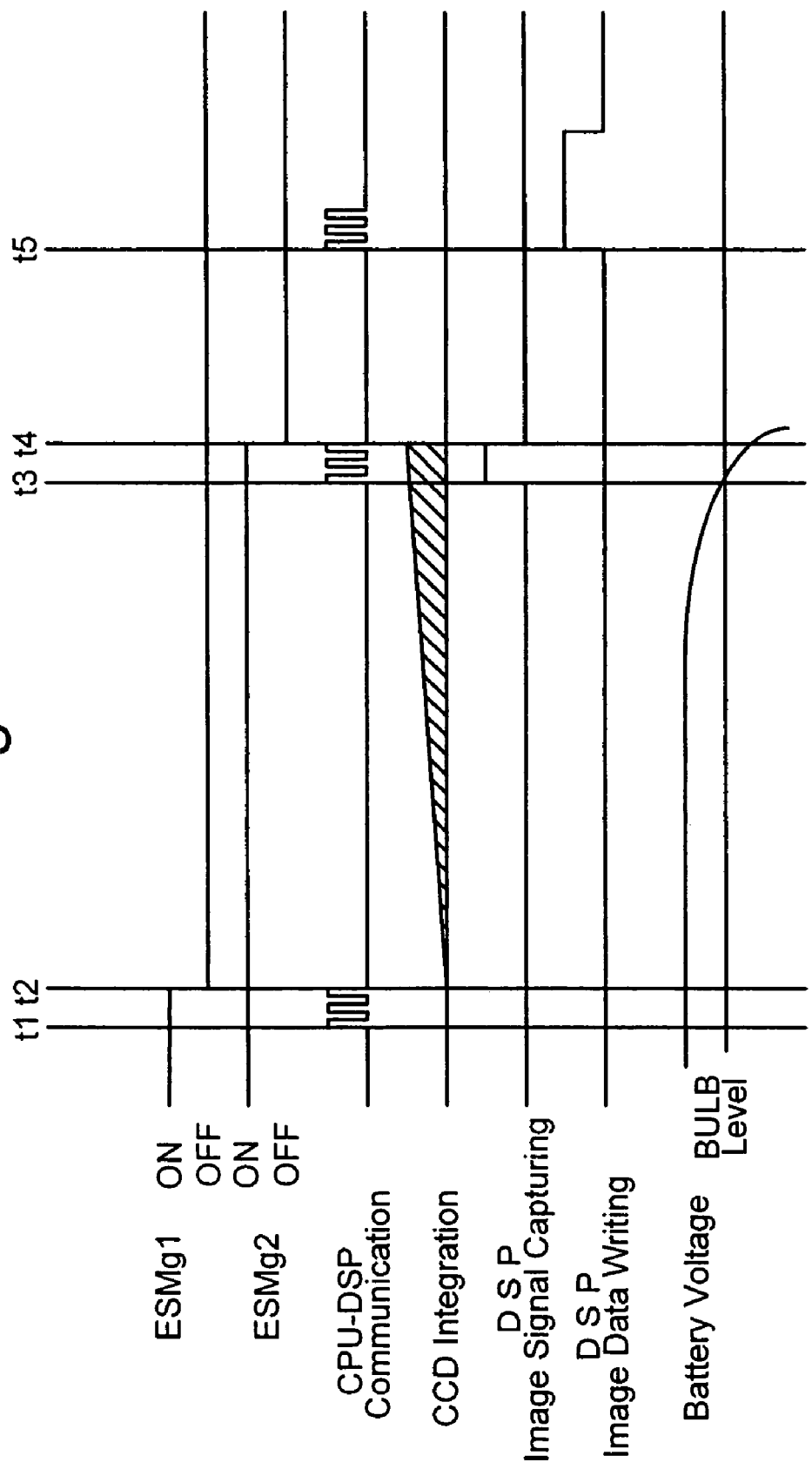

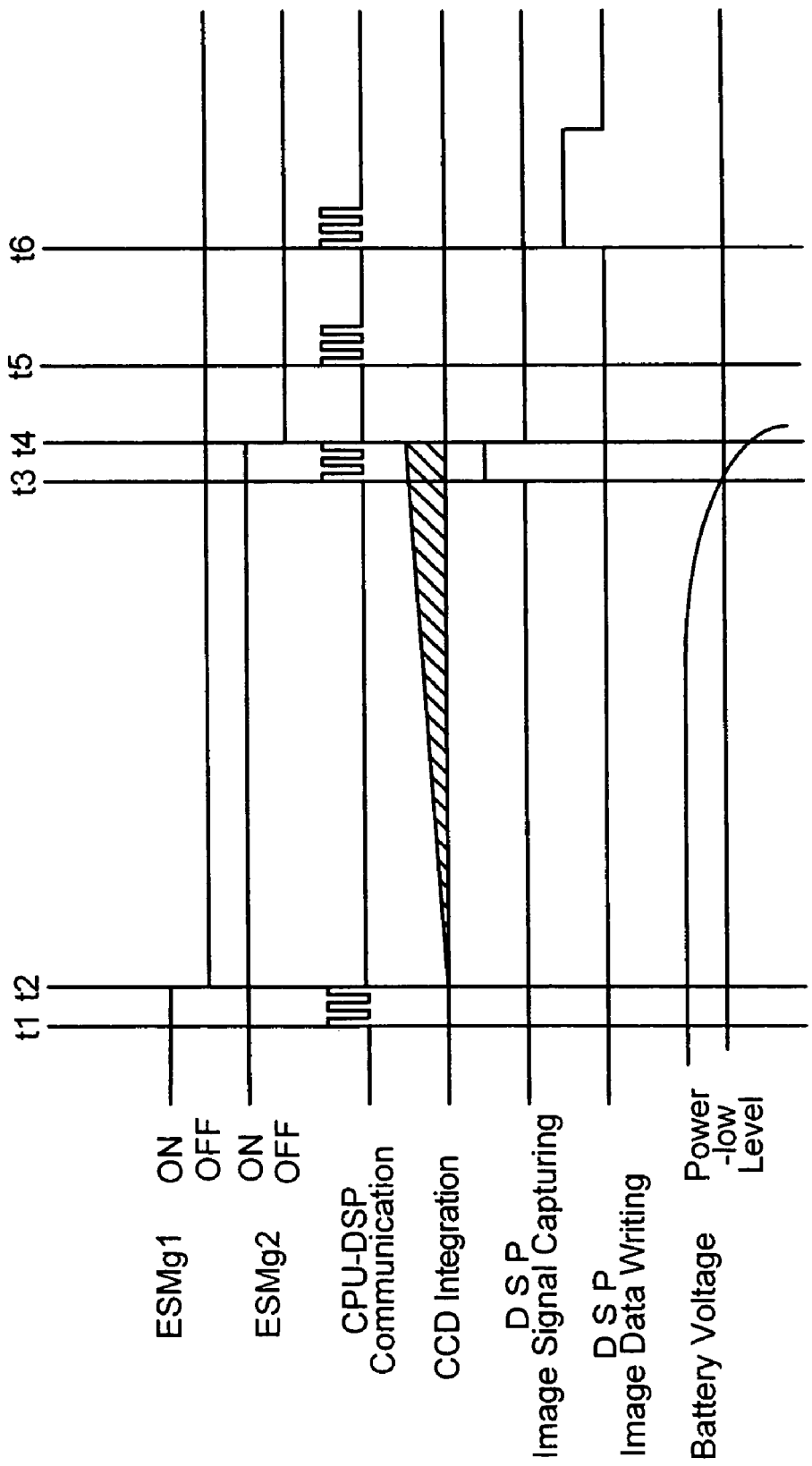

DIGITAL CAMERA WITH A BATTERY CHECKING DEVICE

BACKGROUND OF THE INVENTION

1. Field of the Invention

The present invention relates to a digital camera having an exposure mode (e.g., bulb mode) that is used for long exposures (e.g., an exposure for several seconds or longer).

2. Description of the Related Art

Some digital cameras have an exposure mode in which the shutter remains open for several seconds or longer, e.g., a bulb mode in which the shutter remains open as long as the shutter release button is held down or a slow shutter mode in which the shutter is released at a shutter speed slower than a normal shutter speed. Prior to an exposure operation (photographing operation) in such an exposure mode, a battery check process is generally performed to prevent the camera from malfunctioning due to a battery voltage drop of the digital camera. In the battery check process it is determined whether the battery voltage is below a predetermined voltage level (battery-check level), and an exposure operation is allowed to be performed only when it is determined that the battery voltage is equal to or higher than the battery-check level. If it is determined that the battery voltage is lower than the battery-check level, a warning (e.g., a warning indication) is issued in order to warn the user that the battery is flat (i.e., having insufficient power) to urge the user to replace the battery with a new one, and/or prohibits further use of the flat battery.

However, there is a possibility of the battery voltage dropping below the battery-check level during exposure in slow shutter mode or bulb mode, even if it is determined that the battery voltage is equal to or higher than battery-check level before exposure. This is because the exposure time in such an exposure mode is usually much longer than a normal exposure time. In conventional digital cameras, all the operations are forcibly terminated once the battery voltage drops below the battery-check level even during exposure, which makes it impossible to capture a desired digital image in such circumstances. Consequently, a photographing operation in such a long exposure mode ends up in failure.

SUMMARY OF THE INVENTION

The present invention provides a digital camera which makes it possible to secure a digital image even if a shortage of the battery power is detected during exposure.

The present invention has been devised from the standpoint that digital images captured by a digital camera can be subjected to correction via digital image processing. If an exposure is forcibly terminated due to the battery voltage dropping during exposure, a digital image is secured from the electrical signal which has been accumulated in the image pickup device until moment at which the exposure is forcibly terminated, and the digital image thus obtained is subjected to digital image processing to thereby prevent a photographing operation from ending up in failure.

According to an aspect of the present invention, a digital camera is provided, including an image pickup device which converts incident light of an object image into an electrical signal during an exposure operation; a processor which captures the electrical signal, and thereafter generates a digital image from the electrical signal; a battery checking device which performs a battery check process for determining whether a battery voltage of the digital camera is lower than a predetermined voltage level; a controller which forcibly terminates the exposure operation when the battery checking device determines that the battery voltage drops below the predetermined voltage level during the exposure operation, and subsequently makes the processor start capturing the electrical signal in order to generate a backup digital image; and a warning device which warns a user that the exposure operation is forcibly terminated due to a shortage of the battery voltage and that the backup digital image is underexposed, in the case where the exposure is forcibly terminated.

It is desirable for the digital camera to include an indicator on which at least one of the digital image and a determined result of the battery checking device are indicated. The backup digital image and an underexposure warning indication are both indicated on the indicator in the case where the exposure is forcibly terminated.

It is desirable for the battery checking device to perform the battery check process during exposure at a shutter speed one of equal to and slower than a flash sync speed, and not to perform the battery check process during exposure at a shutter speed faster than the flash sync speed.

It is desirable for the digital camera to include an inverse calculating device for calculating back an amount of underexposure with respect to a correct exposure from a timing of the forced termination of the exposure operation and a correct shutter speed, and a data storing device for storing the backup digital image and corresponding data of the amount of underexposure.

It is desirable for the backup digital image to be visually indicated on the indicator together with the corresponding data of the amount of underexposure.

It is desirable for the digital camera to include a release button which starts the exposure operation upon being depressed, wherein the battery checking device performs the battery check process during the exposure operation when the digital camera is in a bulb mode, in which the exposure continues as long as the release button is held down.

It is desirable for the digital camera to include a remote-control signal receiver which receives a remote control signal transmitted from a remote controller provided independently of the digital camera, wherein the battery checking device performs the battery check process during the exposure when the digital camera is in a remote-control bulb mode, in which the exposure continues as long as the remote-control signal receiver receives the remote control signal.

It is desirable for the predetermined voltage level to be determined by determining a battery type of the battery via a difference in voltage between the battery under a loaded state and the battery under a non-loaded state.

In another embodiment, a digital camera is provided, including an image pickup device which converts incident light of an object image into an electrical signal during an exposure operation; a processor which captures the electrical signal, and thereafter generates a digital image from the electrical signal; a battery checking device which performs a battery check process for determining whether a battery voltage of the digital camera is lower than a predetermined voltage level; a controller which forcibly terminates the exposure operation when the battery checking device determines that the battery voltage drops below the predetermined voltage level during the exposure operation, and subsequently makes the processor start capturing the electrical signal in order to generate a backup digital image, the battery checking device performs the battery check process during exposure at a shutter speed one of equal to and slower than a flash sync speed, and does not perform the battery check process during exposure at a shutter speed faster than the flash sync speed.

It is desirable for the digital camera to include a warning device which warns a user that the exposure operation is forcibly terminated due to a shortage of the battery voltage and that the backup digital image is underexposed, in the case where the exposure is forcibly terminated.

In the digital camera according to the present invention, since the processor commences to capture an electrical signal from the image pickup device at the same time an exposure is forcibly terminated in the event that the battery voltage drops below a predetermined voltage level during exposure, a backup digital image can be reliably obtained from the electrical signal which has been accumulated in the image pickup device until the forced termination of the exposure. Although the backup digital image thus obtained turns out to be an underexposed image, the backup digital image can be subjected to digital image processing to produce a corrected digital image as if it had been captured at correct exposure. Accordingly, even if the digital camera lapses into a shortage of battery power during exposure (especially during a long exposure), the worst case scenario in which no digital image data during exposure remains can be prevented from occurring. In addition, since the backup digital image obtained when an exposure is forcibly terminated is visually indicated together with a warning of underexposure on a display monitor, this warning can warn the user that the backup digital image has resulted in underexposure due to a shortage of battery power.

Additionally, in the case where a shutter speed is slower than a flash-sync speed, the backup digital image is visually indicated together with the amount of underexposure (and the amount of exposure compensation) on the display monitor, so that the user can correct the backup digital image via digital image processing with reference to the amount of underexposure (and the amount of exposure compensation) as appropriate.

The present disclosure relates to subject matter contained in Japanese Patent Application No.2004-107071 (filed on Mar. 31, 2004) which is expressly incorporated herein by reference in its entirety.

BRIEF DESCRIPTION OF THE DRAWINGS

The present invention will be described below in detail with reference to the accompanying drawings in which:

FIGS. 2A, 2B, 2C and 2D show a flow chart of a routine "CAMERA MAIN PROCESS" performed in the digital camera having the control system shown in FIG. 1;

FIG. 4 is a timing chart showing various events when it is detected that the battery is flat during exposure in bulb mode; and FIG. 5 is a timing chart showing various events when it is detected that the battery is flat during exposure in slow shutter mode.

DESCRIPTION OF THE PREFERRED EMBODIMENT

Figure 1:
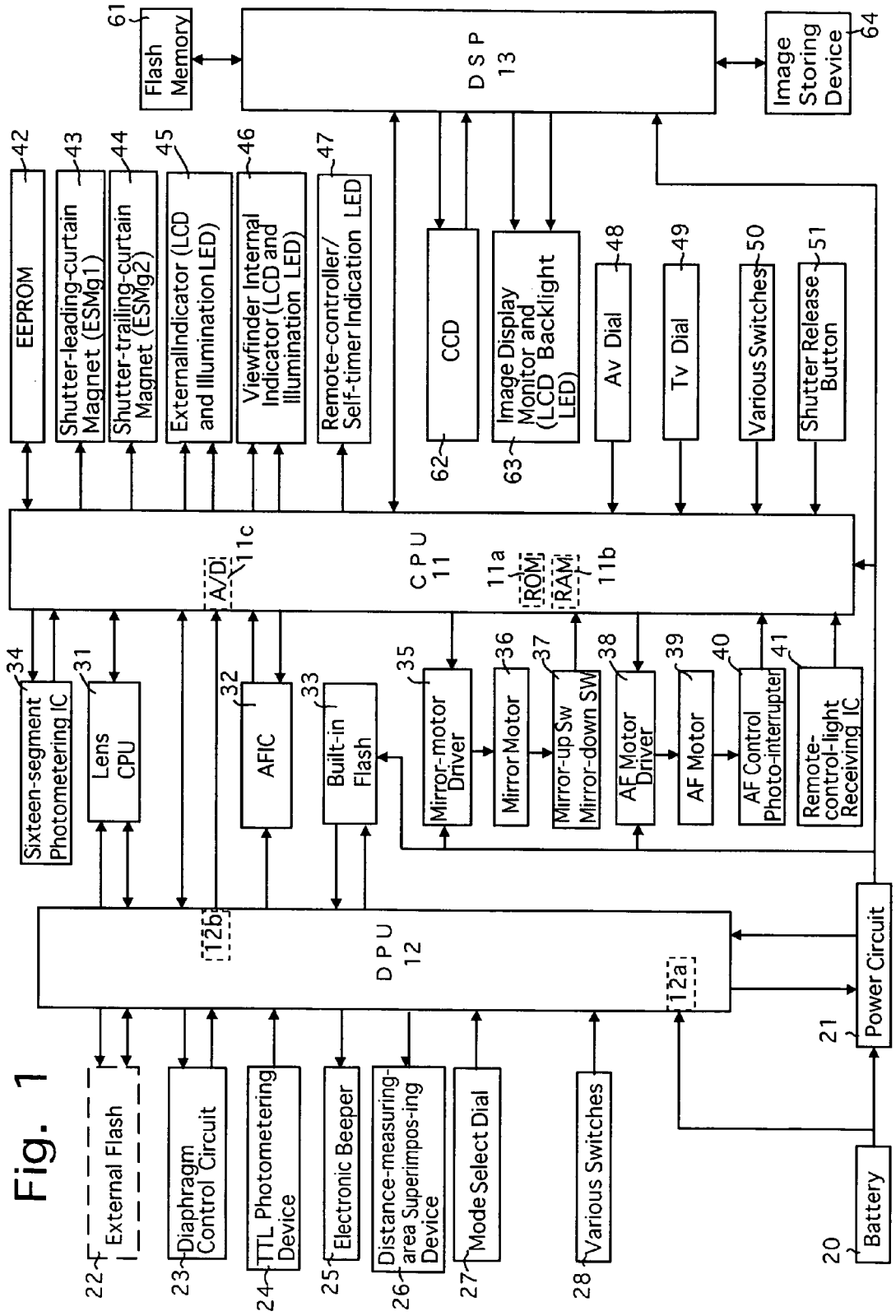
FIG. 1 is a basic block diagram of a control system of an embodiment of a digital camera according to the present invention.
Figure 2C:
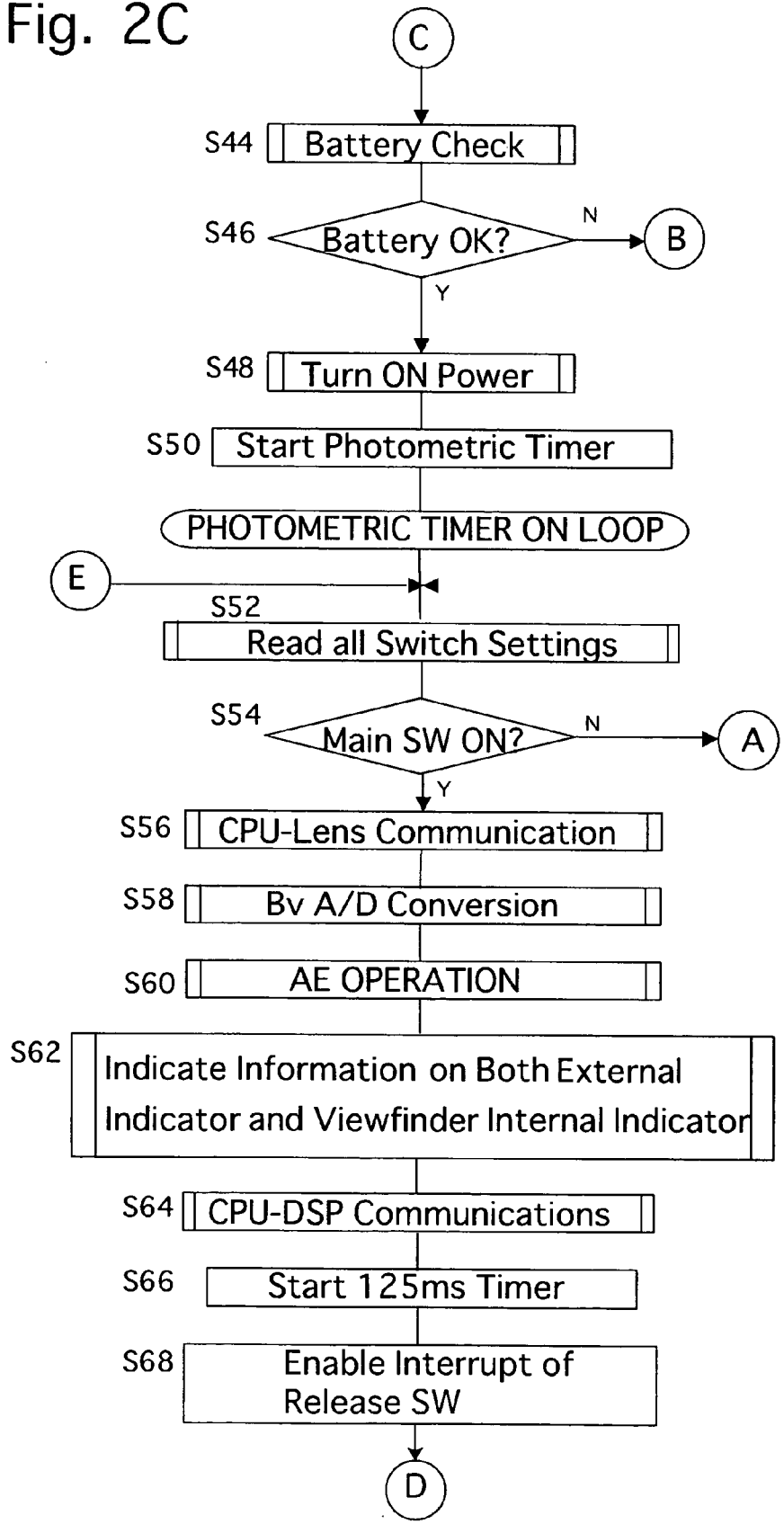
Figure 2D:
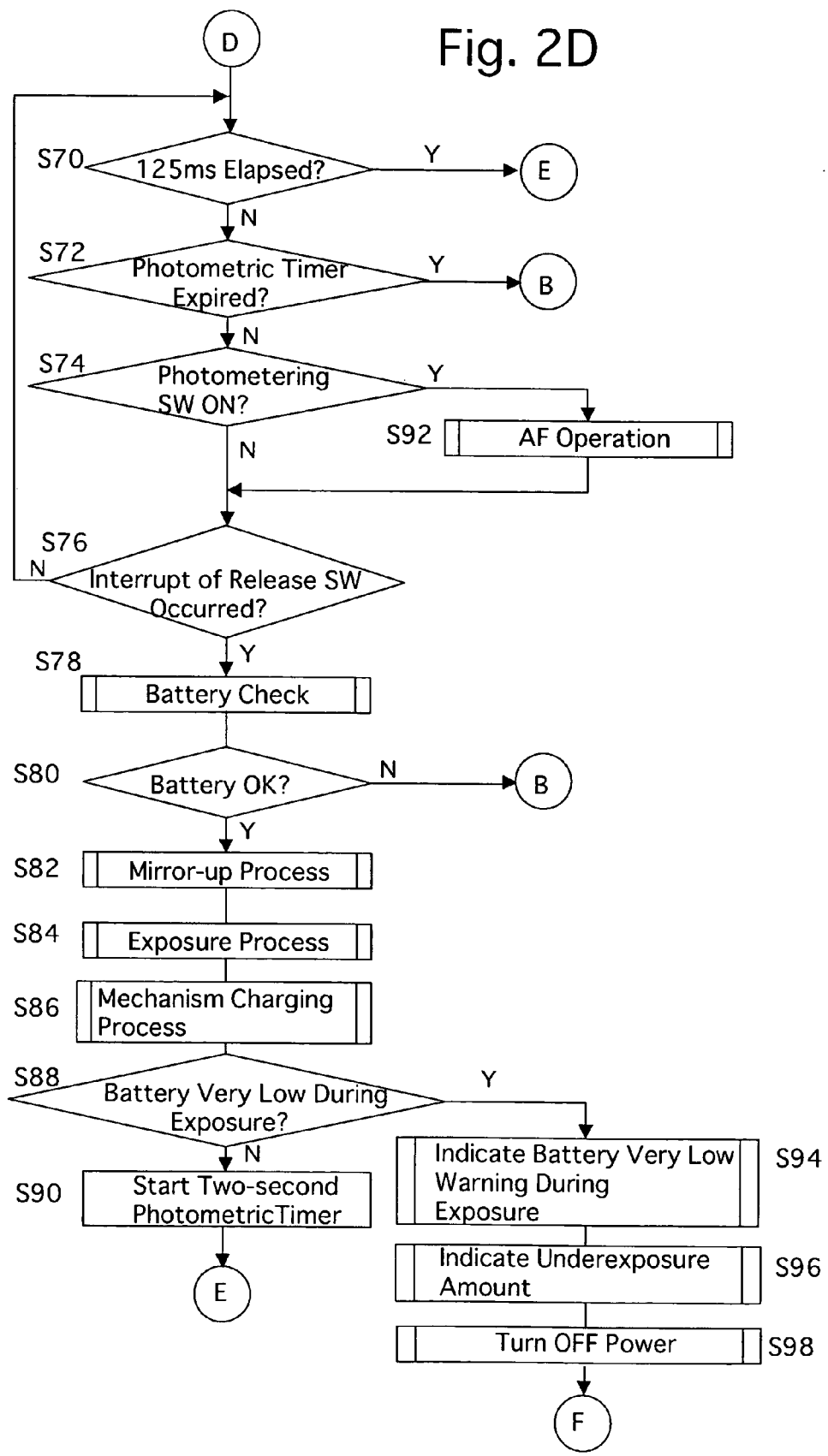

An embodiment of a digital camera the control system which is shown in FIG. 1 is provided with a battery-power check device. The control system is provided with a CPU (controller) 11 and a DPU (processor) 12 for comprehensively controlling the overall operations of the digital camera. The CPU 11 and the DPU 12 are interconnected to each other via a bus line.

The control system is provided with a battery 20, a power circuit 21, an external flash 22, a diaphragm control circuit 23, a TTL light modulating device 24, an electronic beeper 25, a distance-measuring-area superimposing device 26, a mode select dial 27, various switches 28, a lens CPU 31 provided in a photographing lens of the digital camera, an AFIC (auto focus integrated circuit) 32 and a retractable built-in flash 33 which are all connected to the DPU 12. The DPU 12 mutually communicates with the CPU 11. The DPU 12 operates by receiving commands from the CPU 11, and sends the CPU 11 information of various operating statuses and settings of peripheral circuits and elements which are connected to the DPU 12.

The battery 20 is used as a power source of the digital camera, and is connected to each of the DPU 12 and the power circuit 21. One type of battery, which serves as the battery 20, is selected by the user from among different types of batteries such as an alkaline battery, a lithium battery (e.g., CR-V3) and a nickel metal hydride (Ni-MH) battery. The power circuit 21 continuously supplies power to the CPU 11 and the DPU 12, and controls the power supply to a built-in flash 33, a mirror motor driver 35, an AF motor driver 38 and a DSP 13 of the control system, in accordance with a power-supply control command input from the DPU 12.

The DPU 12 is provided with a voltage monitoring terminal 12a which is connected to the battery 20 to monitor the terminal voltage of the battery 20 (hereinafter referred to simply as "battery voltage"), specifically, respective battery voltages under a non-loaded state and a loaded state. The battery voltage that the DPU 12 inputs via the voltage monitoring terminal 12a is output to the CPU 11 through an analog output terminal 12b of the DPU 12. The CPU 11 incorporates an A/D converter 11c for converting the battery voltage output from the analog output terminal 12b of the DPU 12 into a digital signal, and compares this digital signal with a predetermined voltage level (battery-check level) to determine whether the battery voltage is lower than the battery-check level. Since various types of batteries can be selectively used as the battery 20 in the present embodiment of the digital camera as mentioned above, the CPU 11 determines which type of battery is currently used, and sets an appropriate battery-check level in accordance with the type of battery currently used (currently under load). Battery type of the battery 20 can be set not only automatically by the CPU 11 but also manually by the user.

The external flash 22 which is detachably mounted to a camera body of the digital camera communicates with the DPU 12, and discharges under control of the DPU 12. The diaphragm control circuit 23 makes a stop-down mechanism (not shown) start stopping down a diaphragm of the photographing lens in accordance with a control signal input from the DPU 12, and outputs EE pulses to the DPU 12 in association with the stop-down operation of the diaphragm. The DPU 12 senses and counts the EE pulses, and outputs a control signal immediately after the count reaches the number of EE pulses which is determined by an AE arithmetic operation. Upon receiving this control signal, the diaphragm control circuit 23 makes the stop-down mechanism stop moving to maintain the f-number of the photographing lens at an f-number corresponding to an appropriate aperture value Av. The TTL light modulating device 24 directly receives light which is emitted from either the built-in flash 33 or the external flash 22 and reflected by an object to be incident on the photographing lens, and outputs a signal corresponding the received light to the DPU 12. The electronic beeper 25 emits beep tones as a warning in accordance with a control signal input from the DPU 12. The distance-measuring-area superimposing device 26 is provided with a plurality of LEDs which are turned ON in accordance with a control signal input from the DPU 12 to indicate a plurality of distance measuring areas (e.g., a plurality of AF frames) in the viewfinder. The mode select dial 27 is a hand-operated member which is manually operated to select a desired exposure mode from among various exposure modes (e.g., programmed AE mode, aperture priority AE mode and shutter priority AE mode) or a setting mode from among various setting modes (e.g., ISO speed setting mode, image size (image quality) setting mode, white balance setting mode and remote control mode). The mode select dial 27 outputs a dial position signal, detected using a coding plate (not shown), to the DPU 12 upon being set to one of a plurality of switching positions corresponding to the aforementioned exposure modes and setting modes. The various switches 28 include an AF button switch, a photometering mode switch (lever switch) and a drive mode switch, and each of the various switches 28 outputs a status thereof to the DPU 12. Various settings are carried out via positional information on the mode select dial 27 or by manually turning an AV dial 48 and/or a TV dial 49 while depressing associated switches of the various switches 28.

The lens CPU 31 that is provided in the photographing lens (not shown) is supplied with power from the battery 20 via the DPU 12, and communicates with the DPU 12 and the CPU 11 via a series of electrical contacts provided on a mounting surface of a lens mount ring on the photographing lens. The lens CPU 31 stores lens data of the photographing lens such as data on focal length, full aperture value and minimum aperture value, and such lens data is read by the DPU 12 and the CPU 11. The AFIC 32 detects a focus state of an object image included in a specific distance measuring area selected from among the aforementioned plurality of distance measuring areas or in each of the aforementioned plurality of distance measuring areas, and converts the received light bundle of the object into an electrical video signal to output the same to the CPU 11. The CPU 11 performs a distance measuring operation in accordance with the video signal input from the AFIC 32. The recharging operation and the discharging operation of the built-in flash 33 are controlled by the DPU 12, and the built-in flash 33 outputs a recharge completion signal to the DPU 12 immediately after the flash voltage reaches a predetermined charge level.

The CPU 11 is provided therein with an internal ROM 11$a$ in which various programs regarding capabilities of the digital camera and other data are written, and an internal RAM 11$b$ in which various parameters, lens data and other data are temporarily stored. In addition to the lens CPU 31 and the AFIC 32, a sixteen-segment photometering IC 34, the mirror motor driver 35, a mirror switch 37, the AF motor driver 38, an AF control photo-interrupter 40, a remote-control-light receiving IC (remote-control signal receiver) 41, an EEPROM 42, a shutter-leading-curtain magnet 43, a shutter-trailing-curtain magnet 44, an external indicator 45, a viewfinder internal indicator 46, a remote-controller/self-timer indication LED 47, the Av dial 48, the Tv dial 49, various switches 50, a shutter release button 51 and the DSP 13 are all connected to the CPU 11.

The sixteen-segment photometering IC 34 divides a photographing area into sixteen photometering areas, and is capable of performing a photometering operation on each photometering area. On each of the sixteen photometering areas which is selected in accordance with a sensor selection signal input from the CPU 11, the sixteen-segment photometering IC 34 outputs an electrical signal corresponding to the amount of light received by each photometering area as information on an object brightness value Bv to the CPU 11. The CPU 11 performs an exposure operation using this information on the object brightness value Bv, an ISO speed information Sv (speed value) and other information to determine a optimum value Ev, a optimum shutter speed Tv (time value) and a optimum aperture value Av. The CPU 11 further calculates the number of EE pulses corresponding to the correct aperture value Av which are output from the diaphragm control circuit 23 in association with the stop-down operation of stop-down mechanism (not shown).

The mirror motor driver 35 controls the operation of a mirror motor 36 to move up and down a quick-return mirror (not shown) in accordance with a mirror drive signal input from the CPU 11. The CPU 11 detects whether the quick-return mirror is in an upper (raised) position (or a lower position) from a state of the mirror switch 37 (mirror-position indication signal). The AF motor driver 38 drives an AF motor 39, and controls the operation thereof in accordance with an AF drive signal input from the CPU 11 to move a focusing lens group of the photographing lens to an in-focus position by rotation of the AF motor 39. The AF photo-interrupter 40 outputs AF pulses to the CPU 11 in association with rotation of the AF motor 39, and the CPU 11 stops the driving of the AF motor 39 via the AF motor driver 38 immediately after the number of the AF pulses output from the AF photo-interrupter 40 reaches the number of AF pulses which is determined by an AF arithmetic operation. The remote-control-light receiving IC 41 receives a release command (remote-control release signal) from a supplied remote controller (not shown), and outputs a release signal to the CPU 11 during standby upon receiving the release command from the remote controller.

The EEPROM 42 serves as a memory in which various data concerning photographing operations and adjustments on the camera are stored, and such data is read out by the CPU 11 at an appropriate time. The shutter-leading-curtain magnet (ESMg1) 43 and the shutter-trailing-curtain magnet (ESMg2) 44 are energized and controlled by the CPU 11. When the shutter-leading-curtain magnet 43 and the shutter-trailing-curtain magnet 44 are energized, a leading curtain and a trailing curtain of the mechanical shutter (focal plane shutter) are opened by magnetic force, respectively. The leading curtain and the trailing curtain of the mechanical shutter become free from the magnetic force and start moving immediately after the passage of electric current through the shutter-leading-curtain magnet 43 and the shutter-trailing-curtain magnet 44 is shut off, respectively. Each of the external indicator 45 and the viewfinder internal indicator 46 is provided with an LCD panel for visually indicating various information in accordance with an indication signal input from the CPU 11, and an LED serving as a backlight of the LCD panel which illuminates the LCD panel from behind the LCD panel in accordance with an illumination signal input from the CPU 11. The remote-controller/self-timer indication LED 47 is turned ON by the CPU 11 upon receiving a release command signal from the supplied remote controller or flashes ON and OFF during operation of a self-timer in a self-timer mode to inform the user of the time of a shutter release.

The Av dial 48 is a manual operation member which is mainly operated to set an f-number (manual f-stop setting) of the photographing lens, while the Tv dial is a manual operation member which is operated to set a shutter speed. Information on these settings manually determined by the user are output to the CPU 11. Various settings for image capturing and playback can also be made by rotating the Av dial 48 and the Tv dial 49 in combination with one or more of the various switches 28 or the setting of the mode select dial 27. In the present embodiment of the digital camera, the bulb mode can be selected by rotating the Tv dial 49 up to the slowest shutter speed side. When both the bulb mode and the remote-control photographing mode are selected, the digital camera is in a remote-control bulb mode in which the shutter remains open as long as the remote-control-light receiving IC 41 receives a remote-control release signal from the supplied remote controller. When the bulb mode is selected and the remote-control photographing mode is not selected, the shutter remains open as long as the shutter release button 51 is held down (as long as a release switch SWR is ON). The remote-control bulb mode can be freely selected and canceled by operating the mode select dial 27 as mentioned above. The various switches 50 include a main switch SWM, a lid opening/closing sensor switch for sensing whether the lid for a memory insertion slot of an image storing device (data storing device) 64 is open or closed, and other switches. The shutter release button 51 is a two-stage button wherein a photometering switch SWS and a release switch SWR are turned ON when the shutter release button 51 is half depressed and fully depressed, respectively.

Power supply to the DSP (digital signal processor) 13 is controlled by the DPU 12 and the power circuit 21. The DSP 13 communicates with the CPU 11 to perform image processing in accordance with control signals and various data input from the CPU 11 while there is a power supply to the DSP 13 from the power supply 21. A flash memory 61, a CCD image sensor 62, an image display monitor 63 and the image storing device 64 are electrically connected to the DSP 13. Control programs (firmware) and other programs for the DSP 13 are written in the flash memory 61. The CCD image sensor 62 is positioned behind the shutter. The CCD image sensor 62 converts an object image formed thereon through the photographing lens into electrical signal (pixel data), and outputs the same to the DSP 13 in accordance with control signals input from the DSP 13. The DSP 13 performs various image processing operations on the electrical signal input from the CCD image sensor 62 to generate a digital image capable of being visually indicated on the image display monitor 63. This visual image is indicated on an LCD panel of the image display monitor 63 and also stored as image data in the image storing device 64 at the same time by control of the DSP 13. When storing the image data, the image storing device 64 stores Exif data in regard to the image data at the same time. The DSP 13 also reads the image data stored in the image storing device 64 in order to display the read image data on the image display monitor 63 as a visual image. The image display monitor 63 is composed of an LCD panel and a backlight for illuminating the LCD panel from behind the LCD panel, and is fixed to, e.g., the back of the digital camera. The image storing device 64 is a removable memory which is manually removable from the digital camera through the aforementioned memory insertion slot of the image storing device 64 which can be closed by the lid of the memory insertion slot as mentioned above. The image storing device 64 can be any removable nonvolatile memory such as a flash memory or a micro HD drive.

Operations of the present embodiment of the digital camera according to the present invention will be hereinafter discussed with reference to FIGS. 2A, 2B, 2C, and 2D.

FIGS. 2A, 2B, 2C and 2D show a flow chart of the camera main process which is performed in the present embodiment of the digital camera and controlled by the CPU 11 in accordance with programs written in the internal ROM 11a of the CPU 11. This process is performed when the battery 20 is loaded in the camera.

In the camera main process, firstly the CPU 11 initializes each I/O port and other ports upon the battery 20 being loaded into the camera (step S2), and further initializes constants and correction values which are used for the internal RAM 11b and various processes (step S4). Subsequently, the CPU 11 shuts off the power supply to peripheral circuits via the DPU 12 and the power circuit 21 to bring the camera into a power-off state (step S6), and turns OFF all the LCDs (the external indicator 45 and the viewfinder internal indicator 46) provided on the camera (step S8). Immediately after the camera falls into a power-off state at step S6, a photometric timer is turned OFF if the photometric timer has been started (at step S50) in a photometric-timer ON loop process shown in FIG. 2C (if control returns to step S6 from the photometric-timer ON loop process).

[Main Switch Off Loop Process]

The ON/OFF state of each switch is input (step S10), and it is determined whether the main switch SWM is ON (step S12). If the main switch SWM is OFF (if NO at step S12), an interrupt of a 250 ms timer is enabled, and the 250 ms timer is started (step S14). Subsequently, control enters a CPU standby mode (sleep mode) and waits for the 250 ms timer to expire (step S16). Immediately after a lapse of 250 ms, control cancels the CPU standby mode so that the CPU 11 starts operating (step S18). The operations at steps S10 through S18 are repeated as long as the main switch SWM is OFF. The 250 ms timer sets a period for periodically determining whether the main switch SWM is ON. Upon the main switch SWM being turned ON (if YES at step S12), the CPU 11 again shuts OFF the power supply to peripheral circuits via the DPU 12 and the power circuit 21 to bring the camera into a power-off state (step S20). When the camera falls into a power-off state at step S20, the aforementioned photometric timer is turned OFF if it has been started (at step S50) in the photometric-timer ON loop process shown in FIG. 2C (if control returns to step S6 from the photometric-timer ON loop process).

Subsequently, a battery check process is performed (step S22). In this battery check process which is performed for the first time after the power of the camera is turned ON, a battery type determining operation in which the type of the loaded battery 20 is determined from the difference in voltage between the battery 20 under a non-loaded state and the battery 20 under a loaded state is performed, and an appropriate battery check level which corresponds to the type of the battery 20 is determined. Note that "under a non-loaded state" refers to a state where the battery 20 supplies power only to the CPU 11, the DPU 12 and the DSP 13, and that "under a loaded state" refers to, e.g., a state where the AF motor 39 is driven. If it is detected that the difference in voltage between the battery 20 under a non-loaded state and the battery 20 under a loaded state is below a predetermined reference level, the battery 20 is determined as a Ni-MH battery, and the battery-check level is set at a level appropriate for a Ni-MH battery (rated as 1.2 volts), subsequently this battery-check level is compared with the battery voltage under a loaded state. On the other hand, if it is detected that the difference in voltage between the battery 20 under a non-loaded state and the battery 20 under a loaded state is equal to or greater than the aforementioned reference level, the battery 20 is determined as a type other than Ni-MH battery, and the battery-check level is set to another level for a non-Ni-MH battery (rated as 1.5 volts), and subsequently this battery-check level is compared with the battery voltage under a loaded state.

In the present embodiment of the digital camera, for each type of battery a plurality of battery-check levels having different voltage levels in stages are pre-stored in a memory:

a power-low level (for determining that the battery is nearly flat), an empty level (for determining that the battery is flat), a half level (for determining that the remaining battery power is half the power of the fully-charged battery), and a BULB level (used during exposure in bulb mode). As a result of comparing battery-check level with the battery voltage under a loaded state, a power-low flag is set to 1 if the battery voltage under a loaded state is below the power-low level or the BULB level. The BULB level is predetermined to be higher than the power-low level because the exposure time in the bulb mode is indefinite. In a battery check process which is performed for the second time or more, after the power of the camera is turned ON, the aforementioned battery type determining operation is not performed, so that the battery voltage under a loaded state is compared with the battery-check level which has been already determined to correspond to the type of the battery 20 in the firstly performed battery check process. Although the battery type determining operation which is automatically performed by the CPU 11 has been discussed above, the user of the digital camera can manually operate a setting device such as a setting switch to enter information on the type of the loaded battery 20 into the camera.

[Photometric Timer Off Loop Process]

After the completion of the battery check process at step S22, various information necessary prior to an exposure operation (e.g., the number of available frames, battery check result, image size and white balance) are indicated on the external indicator 45 (step S24), ON/OFF states of all switches are input (step S26), and it is determined whether the main switch SWM is ON (step S28). Control returns to step S6 if it is determined at step S28 that the main switch SWM is not ON (if NO at step S28). If the main switch SWM is ON (if YES at step S28), the CPU 11 performs data communications with the lens CPU 31 to input lens data (step S30), and further performs data communications with the DSP 13 (step S32). In the data communications at step S32, camera data such as ON/OFF states of each switch and the result of the battery check process are sent from the CPU 11 to the DSP 13, while DSP data such as the number of available frames and the time of the photometric timer are sent from the DSP 13 to the CPU 11.

Subsequently, an interrupt of the photometering switch SWS is enabled (step S34), an interrupt of a 250 ms timer is enabled, and this 250 ms timer is started (step S36). Subsequently, control enters the CPU standby mode (sleep mode) (step S38). Subsequently, it is determined whether an interrupt of the photometering switch SWS has occurred (step S40). If no interrupt of the photometering switch SWS has occurred (if NO at step S40), control waits for the 250 ms timer to expire, and cancels the CPU standby mode so that the CPU 11 starts operating immediately after a lapse of 250 ms (step S42). Thereafter control returns to step S24. If it is determined that an interrupt of the photometering switch SWS has occurred (if YES at step S40), the battery check process is performed (step S44), and whether the battery 20 is available is determined on the basis of the power-low flag (step S46). The power-low flag is set to 0 if it is determined in the battery check process at step S44 that the battery 20 is OK (available) and is set to 1 if the battery 20 is not OK (not available), respectively. If it is determined at step S44 that the battery 20 is not OK (if NO at step S46), control returns to step S20 so that the operations at steps 20 through step S46 are repeated. In this case, high-power-consumption operations of the camera such as a photometering operation, a distance measuring operation and an exposure operation are prohibited from being performed. If it is determined at step S44 that the battery 20 is OK (if YES at step S46), the battery power commences to be supplied to peripheral circuits via the DPU 12 and the power circuit 21 (step S48), the photometric timer is started (step S50), and control enters the photometric timer ON loop process, which starts at step S52. The time of the photometric timer is determined based on data which is input from the DSP 13 in the data communications performed at step S32.

[Photometric Timer on Loop Process]

In the photometric timer ON loop process, firstly ON/OFF states of all switches are input (step S52), and it is determined whether the main switch SWM is ON (step S54). Control returns to step S6 if it is determined at step S54 that the main switch SWM is not ON (if NO at step S54). If the main switch SWM is ON (if YES at step S54), the CPU 11 performs data communications with the lens CPU 31 to input lens data (step S56).

Subsequently, the information on object brightness value Bv which is output from the sixteen-segment photometering IC 34 is converted into a digital signal to be input to the CPU 11 (step S58), and an AE (automatic exposure) arithmetic operation is performed in accordance with the input lens data, the obtained digital value of the object brightness value Bv and other values (step S60). In the AE arithmetic operation, a correct exposure value Ev, a correct shutter speed Tv (time value) and a correct aperture value Av are calculated, and also the number of EE pulses corresponding to the correct aperture value Av is calculated. After the completion of the AE arithmetic operation, the calculated photometric values (TV and Av), the number of available frames and other information necessary for making an exposure such as battery check result are indicated on both the external indicator 45 and the viewfinder internal indicator 46 (step S62), and also the same calculated photometric values are sent to the DSP 13 via data communication between the CPU 11 and the DSP 13 (step S64). Subsequently, a 125 ms timer is started (step S66), an interrupt of the release switch SWR is enabled (step S68), and control returns to step S52 to perform the photometric timer ON loop process if it is determined that the 125 ms timer which is started at step S66 has expired (if YES at step S70). The 125 ms timer sets a period for periodically performing a photometering process (step S58) and the AE arithmetic process (step S60). If the 125 ms timer which is started at step S66 has not yet expired (if NO at step S70), it is determined whether the photometric timer has expired (step S72), and control returns to step S20 if the photometric timer has expired (if YES at step S72). However, if control enters the photometric timer ON loop process after a two-second photometric timer is started at step S90, control returns to step S20 after two seconds of the two-second photometric timer elapses.

If the photometric timer has not yet expired (if NO at step S72), it is determined whether the photometering switch SWS is ON (step S74). If the photometering switch SWS is ON (if YES at step S74), an AF process is performed (step S92). If the photometering switch SWS is not ON (if NO at step S74), or after the completion of the AF process at step S92, it is determined whether an interrupt of the release switch SWR has occurred (step S76). If no interrupt of the release switch SWR has occurred (if NO at step S76), control returns to step S70 to wait a command for releasing the shutter until the 125 ms timer or the photometric timer expires.

If an interrupt of the release switch SWR has occurred (if YES at step S76), the battery check process is performed (step S78), and whether the battery 20 is OK is determined on the basis of the power-low flag (step S80). If it is determined at step S80 that the battery 20 is not OK (if NO at step S80), control returns to step S20, at which the camera is brought into a power-OFF state, and prohibits operations of the camera such as a photometering operation, a distance measuring operation and an exposure operation from being performed. If it is determined at step S80 that the battery 20 is OK (if YES at step S80), a mirror-up process, an exposure process (see FIGS. 3A, 3B and 3C) and a mechanism charging process are performed in that order (steps S82, S84 and S86). Subsequently, it is determined whether the power of the battery 20 has become very low during exposure (step S88).

If it is determined that the power of the battery 20 has become very low during exposure (if YES at step S88), the backup digital image, together with a warning indication is indicated on the LCD panel of the image display monitor 63 via the DSP 13, and a similar warning indication is indicated on the external indicator 45 in a manner so that the indication flashes ON and OFF (step S94). This warning indication indicates that the backup digital image has resulted in underexposure because the exposure was forcibly terminated during exposure due to a shortage of battery power. Subsequently, the amount of underexposure of the backup digital image is also indicated on the LCD panel of the image display monitor 63. These indicating operations warn the user that the battery 20 is nearly exhausted (nearly flat). Subsequently, the power of the camera is turned OFF via the DPU 12 and the power circuit 21 (step S98), and control returns to step S24. If it is detected at step S88 that the power of the battery 20 has not become very low during exposure (if NO at step S88), the two-second photometric timer is started at step S90, and control returns to step S20 after two seconds of the two-second photometric timer elapses.

Figure 3A:
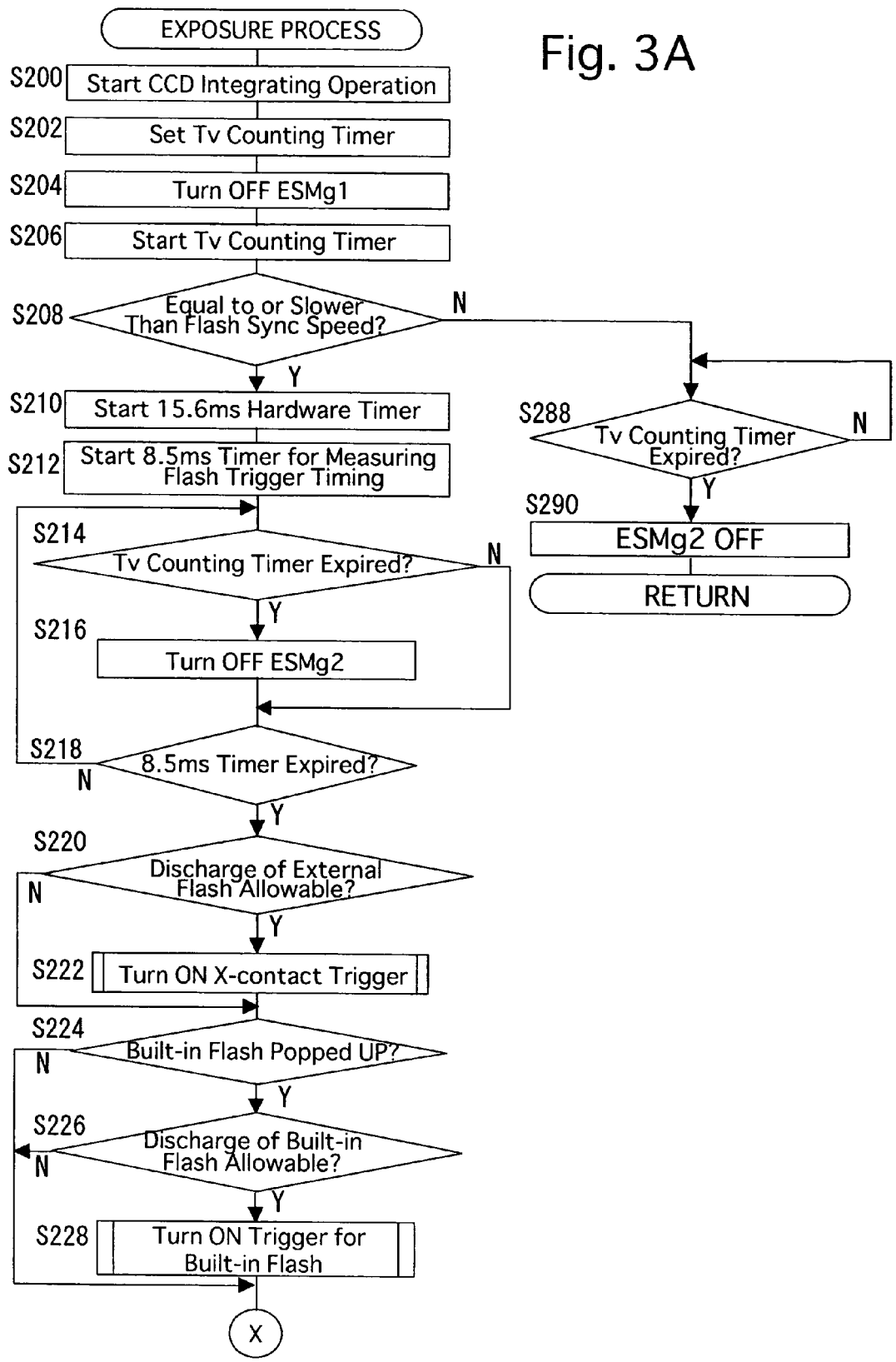
FIGS. 3A, 3B and 3C show a flow chart of a subroutine "EXPOSURE PROCESS" performed in the routine "CAMERA MAIN PROCESS" shown in FIG. 2D.
Figure 3B:
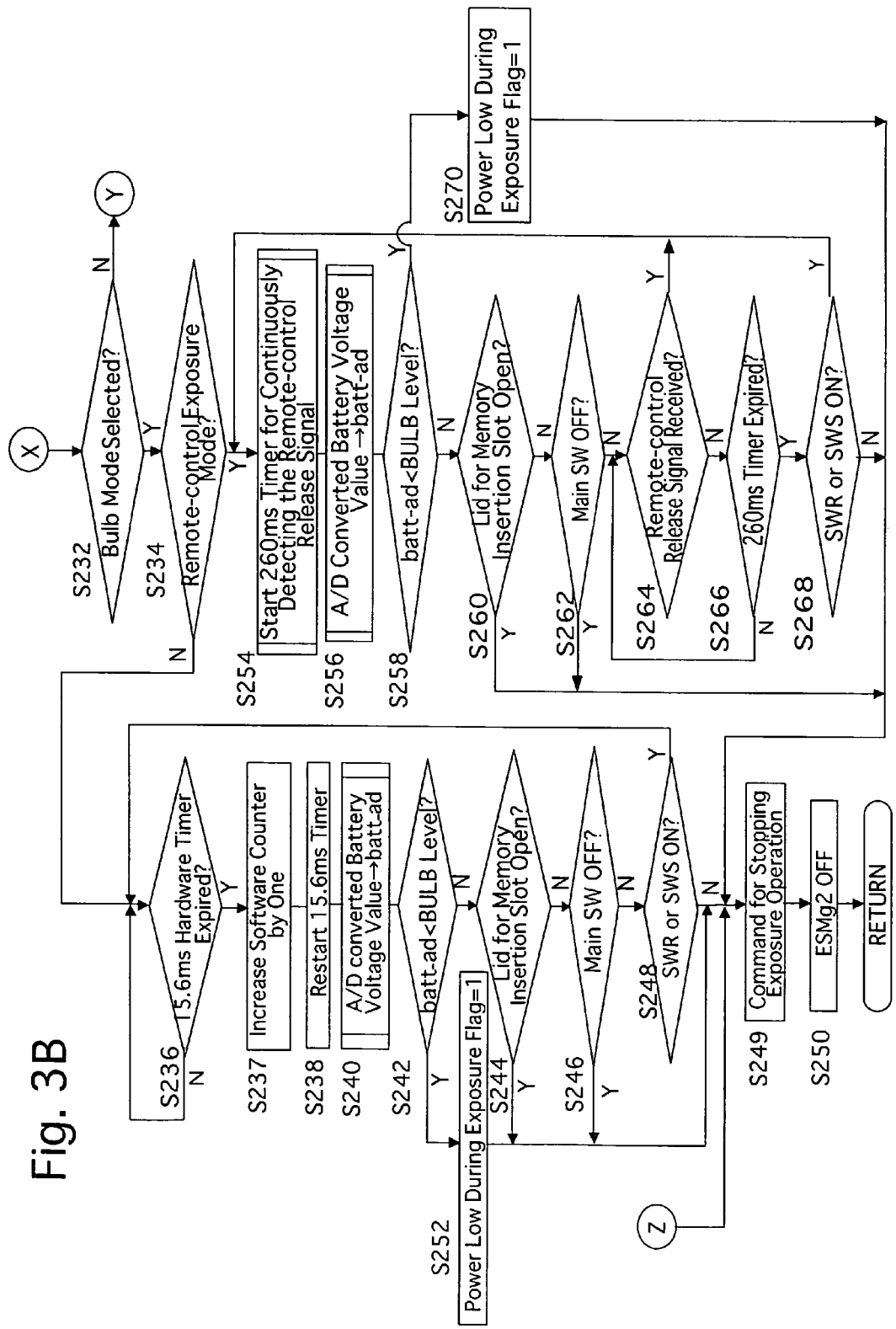
Figure 3C:
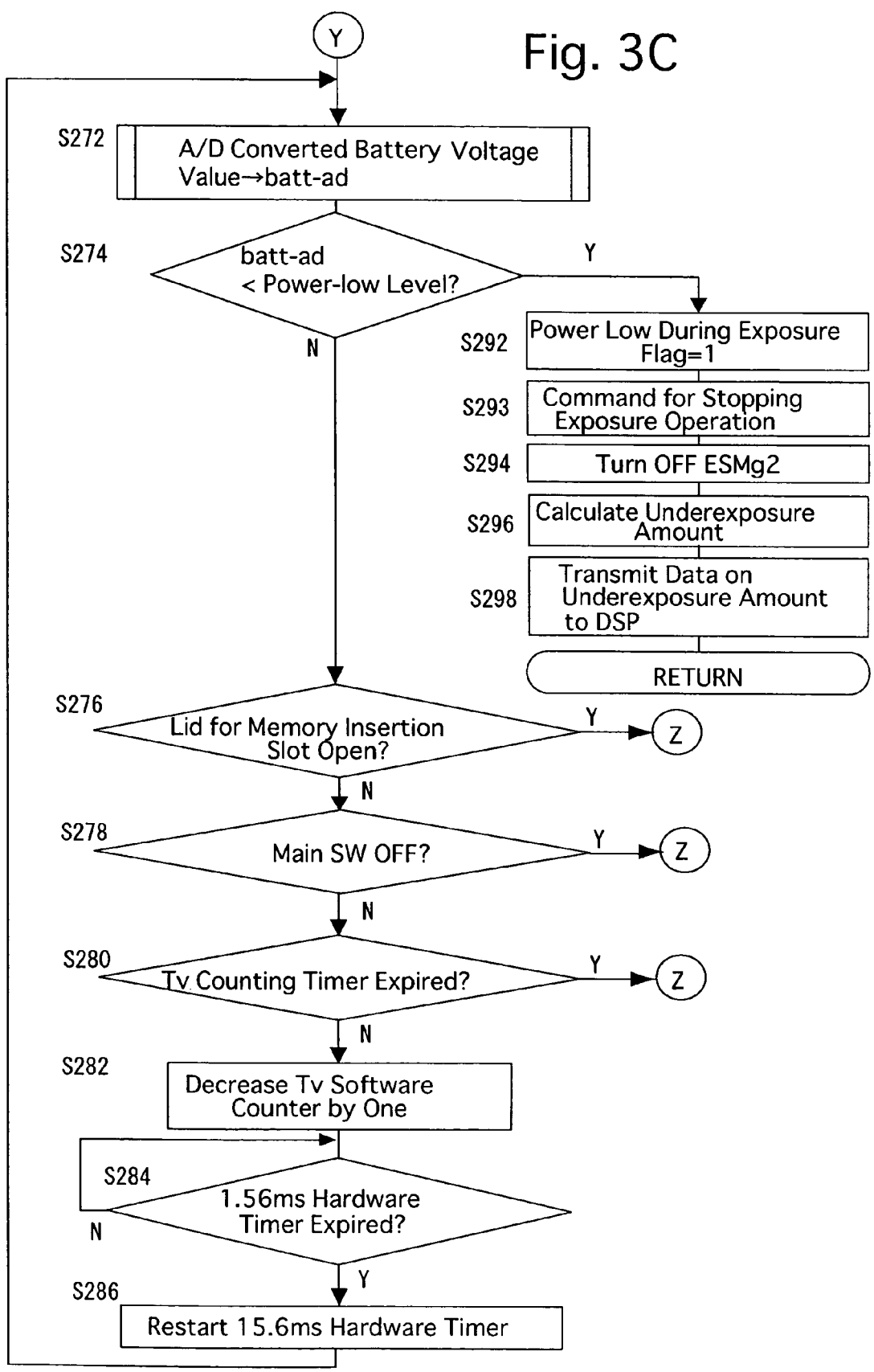

The exposure process will be hereinafter discussed with reference to the flow chart shown in FIGS. 3A, 3B and 3C and the timing charts shown in FIGS. 4 and 5. The exposure process is performed immediately after the mirror-up operation at step S82 if it is determined at step S80 that the battery 20 is OK. FIG. 4 is a timing chart showing various events when it is detected that the power of the battery 20 becomes very low during exposure in bulb mode, while FIG. 5 is a timing chart showing various events when it is detected that the power of the battery 20 becomes very low during exposure in slow shutter mode.

In the exposure process, firstly a command for starting an exposure is output to the DSP 13 to make the CCD image sensor 62 start accumulating electric charges via the DSP 13 (step S200; time t1 shown in FIGS. 4 and 5). The amount of accumulated charges to the CCD image sensor 62 increases with the passage of time. Subsequently, a hardware timer (Tv counting timer) for measuring an exposure time is set at the correct shutter speed (time value) Tv obtained in the AE arithmetic operation performed at step S60 (step S202), and the power supplied to the shutter-leading-curtain magnet 43 is shut off so that the leading curtain of the shutter starts moving (step S204; time t2 shown in FIGS. 4 and 5).

Subsequently, the Tv counting timer that is set at step S202 is started (step S206), and it is determined whether the correct shutter speed Tv is equal to or slower than a flash sync speed (e.g., 1/150 sec), at which the shutter is fully open (step S208). In the case where bulb mode (which requires an operation of the shutter release button 51) or the remote-control bulb mode is currently selected, the correct shutter speed Tv will be determined as being equal to or slower than the flash sync speed.

[Normal Exposure]

In an exposure operation in which the shutter is released at a shutter speed Tv faster than the flash sync speed, i.e., in a normal exposure operation, the battery check process does not have to be performed during exposure because there is little possibility of the battery voltage suddenly dropping during exposure immediately after the battery voltage is determined to be equal to or higher than the battery-check level. In the present embodiment of the digital camera, if it is determined that the correct shutter speed Tv is not either equal to or slower than the flash sync speed (if NO at step S208), it is determined whether the Tv counting timer has expired (step S288). Control repeats the operation at step S288 until the Tv counting timer expires (if NO at step S288). Upon expiration of the Tv counting timer (if YES at step S288), the power supplied to the shutter-trailing-curtain magnet 44 is shut off (step S290), and control returns to the camera main process, i.e., proceeds to step S86 shown in FIG. 2D.

[Long Exposure]

Contrary to the above described normal exposure operation, in an exposure operation in which the shutter is released at a shutter speed Tv is equal to or slower than the flash sync speed, i.e., in a long exposure operation, there is a possibility of the battery voltage suddenly dropping during exposure even shortly after the battery voltage is determined to be equal to or higher than the battery-check level. Accordingly, the battery check process is periodically performed even during exposure. Namely, if it is determined that the correct shutter speed Tv is equal to or slower than the flash sync speed (if YES at step S208), a 15.6 ms timer is started (step S210), and an 8.5 ms timer for measuring a flash trigger timing is started (step S212). The 15.6 ms timer is a hardware timer for periodically checking an ON/OFF state of the main switch SWM and an ON/OFF state of a memory-insertion-slot lid switch during an exposure in bulb mode (or remote-control bulb mode), and the exposure time is measured by counting the number of times the operation of the 15.6 ms timer has been carried out with a software counter. Subsequently, it is determined whether the Tv counting timer has expired (step S214). It is determined that the Tv counting timer has expired during the operation of the 8.5 ms timer at step S214 only when the correct shutter speed Tv is in a range of 1/45 to 1/150 seconds. If the Tv counting timer is already expired (if YES at step S214), the power supplied to the shutter-trailing-curtain magnet 44 is shut off so that the trailing curtain of the shutter starts moving (step S216). Control skips the operation at step S216 if the Tv counting timer has not yet expired. Subsequently, it is determined whether the 8.5 ms timer that has been started at step S212 has expired (step S218). If it is detected at step S218 that the 8.5 ms timer has not yet expired (if NO at step S218), the operations at steps 214 through 218 are repeated until the 8.5 ms timer expires.

Upon the expiration of the 8.5 ms timer (if YES at step S218), it is determined whether conditions necessary for allowing the external flash 22 to discharge are satisfied (i.e., whether the external flash 22 is connected to the camera, whether the external flash 22 is fully charged, etc.) (step S220). If it is determined that such necessary conditions are satisfied (if YES at step S220), an X-contact trigger for the external flash 22 is turned ON to thereby cause the external flash 22 to discharge (step S222). Control skips the operation at step S222 if the aforementioned necessary conditions are not satisfied (if NO at step S220).

Subsequently, it is determined whether the built-in flash 33 is in a predetermined popped-up position (raised position) (step S224). If the built-in flash 33 is in the popped-up position (if YES at step S224), it is determined whether conditions necessary for allowing the built-in flash 33 to discharge are satisfied (i.e., whether the built-in flash 33 is fully charged, whether the built-in flash 33 is prohibited from discharging, etc.) (step S226). If such necessary conditions are satisfied (if YES at step S226), a trigger for the built-in flash 33 is turned ON to thereby cause the built-in flash 33 to discharge (step S228), and control proceeds to step S232. Control skips the operation at step S228 and proceeds to step S232 if the aforementioned necessary conditions are not satisfied (if NO at step S226).

Subsequently, it is determined whether the bulb mode is currently selected by the Tv dial 49 (step S232). If the bulb mode is currently selected (if YES at step S232), it is determined whether the remote-control exposure mode is currently selected (step S234).

[Bulb Mode That Requires an Operation of the Shutter Release Button]

If it is determined that the remote-control exposure mode is not currently selected (if NO at step S234), this means that the camera is in the middle of performing an exposure operation in bulb mode, and accordingly, control proceeds to step S236 so that the shutter remains open as long as the shutter release button 51 is held down.

More specifically, control waits for the 15.6 ms timer to expire (if NO at step S236). When the 15.6 ms timer expires (if YES at step S236), a software counter for counting the number of times the operation of the 15.6 ms timer has been performed is increased by one (step S237), the 15.6 ms timer is restarted (step S238), and the battery voltage is converted into a digital voltage value (A/D converted voltage value) (step S240). At step S240, the A/D converted voltage value is stored in the RAM 11b as a battery voltage value 'batt-ad'.

It is determined whether the battery voltage value 'batt-ad' is lower than the BULB level (step S242). If the battery voltage value 'batt-ad' is lower than the BULB level (if YES at step S242), a power-low during exposure flag is set to 1 (step S252), a command for stopping the exposure operation is output to the DSP 13 (step S249; time t3 shown in FIG. 4), and the power supplied to the shutter-trailing-curtain magnet 44 is shut off so that the trailing curtain of the shutter starts moving (step S250; time t4 shown in FIG. 4). This forcibly terminates the exposure operation.

Upon inputting the exposure-operation stopping command (time t3 shown in FIG. 4), the DSP 13 forcibly terminates the accumulating operation of the CCD 62 to start capturing electrical signals from the CCD 62 which have been accumulated until the forced termination of the exposure operation. The electrical signals thus captured are subjected to image processing in the DSP 13 to be formed (generate) a backup digital image capable of being indicated on the image display monitor 63. This backup digital image is stored in the image storing device 64 as image data by the DSP 13 (time t5 shown in FIG. 4), and is indicated, together with the aforementioned underexposure warning indication, on the LCD panel of the image display monitor 63 (via the DSP 13 in the process at step S94 when control returns thereto after the completion of the mechanism charging process performed at step S86). At the same time, the aforementioned similar underexposure warning indication is also indicated on the external indicator 45 (and also on the viewfinder internal indicator 46).

If the battery voltage value 'batt-ad' is not lower than the BULB level (if NO at step S242), it is determined whether the lid for the memory insertion slot of the image storing device 64 is open from a state of the memory-insertion-slot lid switch (step S244). If this lid is not open (if NO at step S244), it is determined whether the main switch SWM is OFF (step S246). If the main switch SWM is not OFF (if NO at step S246), it is determined whether the photometering switch SWR or the release switch SWS is ON (step S248). If at least one of the photometering switch SWR and the release switch SWS is ON (if YES at step S248), control returns to step S236.

The operations at steps S236 through S248 continue to be performed once every 15.6 milliseconds unless the battery voltage value 'batt-ad' becomes lower than the BULB level, unless the lid opening/closing sensor switch senses that the lid for the memory insertion slot of the image storing device 64 is open, unless the main switch SWM is turned OFF, or unless both the photometering switch SWR and the release switch SWS are turned OFF. If the lid for the memory insertion slot of the image storing device 64 is open (if YES at step S244), if the main switch SWM is OFF (if YES at step S246) or if both the photometering switch SWR and the release switch SWS are OFF (if NO at step S248), even though the battery voltage value 'batt-ad' is equal to or higher than the BULB level, control proceeds to step S249 so that a command for stopping the exposure operation is output to the DSP 13 (step S249), and subsequently the power supplied to the shutter-trailing-curtain magnet 44 is shut off so that the trailing curtain of the shutter starts moving (step S250).

This completes the exposure operation, and accordingly, the DSP 13 forcibly terminates the accumulating operation of the CCD 62 to start capturing electrical signals from the CCD 62 to thereby obtain a digital image (correct digital image) capable of being indicated on the image display monitor 63 while storing the digital image in the image storing device 64 as image data.

[Remote-Control Bulb Mode]

If it is determined at step S234 that remote-control exposure mode is currently selected (if YES at step S234), this means that the camera is in the middle of performing an exposure operation in bulb mode using the supplied remote controller, i.e., remote-control bulb mode, and accordingly, the shutter remains open as long as the remote-control-light receiving IC 41 receives a remote-control release signal from the supplied remote controller. In this case, control proceeds to step S254 at which a 260 ms timer for continuously detecting the remote-control release signal is started. The 260 ms timer serves as a timer for detecting the remote-control release signal, which is transmitted from the supplied remote controller once every 250 milliseconds as long as a release button provided on the supplied remote controller is held down. Subsequently, the battery voltage is converted into a digital voltage value (A/D converted voltage value), which is in turn stored in the RAM 11b as a battery voltage value 'batt-ad' (step S256), and it is determined whether the battery voltage value 'batt-ad' is lower than the BULB level (step S258).

If the battery voltage value 'batt-ad' is lower than the BULB level (if YES at step S258), the power-low during exposure flag is set to 1 (step S270), a command for stopping the exposure operation is output to the DSP 13 (step S249; time t3 shown in FIG. 4), and the power supplied to the shutter-trailing-curtain magnet 44 is shut off so that the trailing curtain of the shutter starts moving (step S250; time t4 shown in FIG. 4). This forcibly terminates the exposure operation. Immediately after the DSP 13 inputs the exposure-operation stopping command (time t3 shown in FIG. 4), the DSP 13 forcibly terminates the accumulating operation of the CCD 62 to start capturing electrical signals from the CCD 62 which have been accumulated until the forced termination of the exposure operation. The electrical signals thus captured are subjected to image processing in the DSP 13 to generate a backup digital image capable of being indicated on the image display monitor 63. This backup digital image is stored in the image storing device 64 as image data by the DSP 13 (time t5 shown in FIG. 4). In the process at step S94 in the camera main process shown in FIG. 2D, the backup digital image and the aforementioned underexposure warning indication are both indicated on the LCD panel of the image display monitor 63 via the DSP 13. At the same time, the aforementioned similar underexposure warning indication is also indicated on the external indicator 45 (and also on the viewfinder internal indicator 46).

If the battery voltage value 'batt-ad' is not lower than the BULB level (if NO at step S258), it is determined whether the lid for the memory insertion slot of the image storing device 64 is open from a state of the memory-insertion-slot lid switch (step S260). If this lid is not open (if NO at step S260), it is determined whether the main switch SWM is OFF (step S262). If the main switch SWM is not OFF (if NO at step S262), it is determined whether the remote-control-light receiving IC 41 has received the remote-control release signal (step S264). If the remote-control-light receiving IC 41 has not received the remote-control release signal (if NO at step S264), it is determined whether the 260 ms timer has expired (step S266). If the 260 ms timer has not yet expired (if NO at step S266), control returns to step S264 to wait for either the 260 ms timer to expire or the remote-control-light receiving IC 41 to receive the remote-control release signal. If the 260 ms timer expires (if YES at step S266), it is determined whether the photometering switch SWR or the release switch SWS is ON (step S268). If at least one of the photometering switch SWR and the release switch SWS is ON (if YES at step S268) or if the remote-control-light receiving IC 41 receives the remote-control release signal before the 260 ms timer expires (if YES at step S264) control returns to step S254 to repeat the operations at steps S254 through S268. If the lid for the memory insertion slot of the image storing device 64 is open (if YES at step S260), if the main switch SWM is OFF (if YES at step S262), if the remote-control-light receiving IC 41 does not receive the remote-control release signal before the 260 ms timer expires or if both the photometering switch SWR and the release switch SWS are not ON (if NO at step S268), control proceeds to step S249. At the operations at steps S249 and S250, a command for stopping the exposure operation is output to the DSP 13, and the power supplied to the shutter-trailing-curtain magnet 44 is shut off so that the trailing curtain of the shutter starts moving. The DSP 13 forcibly terminates the accumulating operation of the CCD 62 to start capturing electrical signals from the CCD 62 to thereby obtain a digital image (correct digital image) capable of being indicated on the image display monitor 63 while storing the digital image in the image storing device 64 as image data.

[Slow Shutter Mode]

The operations which are performed when it is determined at step S232 that bulb mode is selected have been discussed above. Operations which are performed in the case where a shutter speed Tv is equal to or slower than the flash sync speed and where the bulb mode is not selected (if NO at step S232), i.e., operations which are performed in slow shutter mode, will be discussed hereinafter. In the slow shutter mode, control proceeds to step S272 to perform an exposure operation at a shutter speed Tv which is manually set by the Tv dial 49 or a calculated correct shutter speed Tv. More specifically, firstly the battery voltage is converted into a digital voltage value (A/D converted voltage value), which is in turn stored in the RAM 11b as a battery voltage value 'batt-ad' (step S272), and subsequently it is determined whether the battery voltage value 'batt-ad' is lower than the power-low level (step S274).

If the battery voltage value 'batt-ad' is lower than the power-low level (if YES at step S274), the power-low during exposure flag is set to 1 (step S292), a command for stopping the exposure operation is output to the DSP 13 (step S293; time t3 shown in FIG. 5), and the power supplied to the shutter-trailing-curtain magnet 44 is shut off so that the trailing curtain of the shutter starts moving (step S294; time t4 shown in FIG. 5). This forcibly terminates the exposure operation.

Immediately after the DSP 13 inputs the exposure-operation stopping command (time t3 shown in FIG. 5), the DSP 13 forcibly terminates the accumulating operation of the CCD 62 to start capturing electrical signals from the CCD 62 which have been accumulated until the forced termination of the exposure operation. The electrical signals thus captured are subjected to image processing in the DSP 13 to be formed (generate) a backup digital image capable of being indicated on the image display monitor 63.

Subsequently, the CPU (inverse calculating device) 11 calculates the timing of the forced termination of the exposure operation via the value of the Tv software counter which counts the number of times the operation of the 15.6 ms timer has been carried out and the remaining time of the 15.6 ms timer, and calculates the amount of underexposure which corresponds to the calculated timing in forced termination of the exposure operation (step S296). Subsequently, this data of the amount of underexposure is transmitted to the DSP 13 (step 298; time t5 shown in FIG. 5), and control returns to the camera main process, i.e., proceeds to step S86 shown in FIG. 2D. When storing (writing) image data in the image storing device 64, the DSP 13 writes the backup digital image data in the image storing device 64 together with the data of the amount of underexposure in the form of Exif data upon receiving the data of the amount of underexposure from the CPU 11 (time t6 shown in FIG. 5).

This amount of underexposure and this backup digital image are indicated, together with the aforementioned underexposure warning indication, on the LCD panel of the image display monitor 63 in the process at step S94 when control returns thereto from the operation at step S298. At the same time, the aforementioned similar warning indication is also indicated on the external indicator 45 (and also on the viewfinder internal indicator 46).

If the battery voltage value 'batt-ad' is not lower than the power-low level (if NO at step S274), it is determined whether the lid for the memory insertion slot of the image storing device 64 is open from a state of the memory-insertion-slot lid switch (step S276). If this lid is not open (if NO at step S276), it is determined whether the main switch SWM is OFF (step S278). If the main switch SWM is not OFF (if NO at step S278), it is determined whether the Tv counting timer has expired (step S280). If the Tv counting timer has not yet expired (if NO at step S280), the Tv software counter is decreased by one (step S282), and control waits for the 15.6 ms timer to expire (if NO at step S284), and when the 15.6 ms timer expires (if YES at step S284), the 15.6 ms timer is restarted (step S286), and control returns to step S272.

The operations at steps S272 through S286 continue to be performed once every 15.6 milliseconds unless the battery voltage value 'batt-ad' becomes lower than the power-low level, unless the lid for the memory insertion slot of the image storing device 64 is opened, unless the main switch SWM is turned OFF, or unless the time value (shutter speed) Tv elapses. If the lid for the memory insertion slot of the image storing device 64 is open (if YES at step S276), if the main switch SWM is OFF (if YES at step S278) or if the time value (shutter speed) Tv elapses (if YES at step S280), even though the battery voltage value 'batt-ad' is equal to or higher than power-low level (even if NO at step S274), control proceeds to step S249 so that a command for stopping the exposure operation is output to the DSP 13 (step S249), and subsequently the power supplied to the shutter-trailing-curtain magnet 44 is shut off so that the trailing curtain of the shutter starts moving (step S250).

This completes the exposure operation, and accordingly the DSP 13 forcibly terminates the accumulating operation of the CCD 62 to start capturing electrical signals from the CCD 62 to thereby obtain a digital image (correct digital image) capable of being indicated on the image display monitor 63 while storing the image in the image storing device 64 as image data.

In the above illustrated embodiment of the digital camera, although an underexposure warning indication and information of the amount of underexposure of the backup digital image are indicated to warn the user of a shortage of the battery power in the case where an exposure operation is forcibly terminated during exposure, it is possible for only the underexposure warning indication be indicated, or for information of the amount of exposure compensation be further calculated to be indicated together with the underexposure warning indication and the amount of underexposure of the backup digital image. If the data of the amount of exposure compensation is indicated together with the warning indication, the amount of exposure compensation can be used as a reference when a backup digital image is compensated due to underexposure by a predetermined image processing software, which saves the user's time and trouble.

Although the user is informed that an exposure operation is forcibly terminated during exposure and that the backup digital image has resulted in underexposure by flashing ON and OFF an underexposure warning indication in the above illustrated embodiment of the digital camera, the user can be informed of the same information in another manner, e.g., by driving the electronic beeper 25 to generate beep tones as a warning sound.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera, comprising:
   an image pickup device which converts incident light of an object image into an electrical signal during an exposure operation;
   a processor which captures said electrical signal, and thereafter generates a digital image from said electrical signal;
   a battery checking device which performs a battery check process for determining whether a battery voltage of said digital camera is lower than a predetermined voltage level;
   a controller which forcibly terminates said exposure operation when said battery checking device determines that said battery voltage drops below said predetermined voltage level during said exposure operation, and subsequently makes said processor start capturing said electrical signal in order to generate a backup digital image; and
   a warning device which warns a user that said exposure operation is forcibly terminated due to a shortage of said battery voltage and that said backup digital image is underexposed, in the case where said exposure operation is forcibly terminated.

2. The digital camera according to claim 1, further comprising an indicator on which at least one of said digital image and a determined result of said battery checking device are indicated,
   wherein said backup digital image and an underexposure warning indication are both indicated on said indicator in the case where said exposure operation is forcibly terminated.

3. The digital camera according to claim 1, wherein said battery checking device performs said battery check process during exposure at a shutter speed one of equal to and slower than a flash sync speed, and does not perform said battery check process during exposure at a shutter speed faster than said flash sync speed.

4. The digital camera according to claim 3, further comprising:
   an inverse calculating device for calculating back an amount of underexposure with respect to a correct exposure from a timing of said forced termination of said exposure operation and an optimum shutter speed; and
   a data storing device for storing said backup digital image and corresponding data of said amount of underexposure.

5. The digital camera according to claim 4, wherein said backup digital image is visually indicated on an indicator together with said corresponding data of said amount of underexposure.

6. The digital camera according to claim 1, further comprising a release button which starts said exposure operation upon being depressed,
   wherein said battery checking device performs said battery check process during said exposure operation when said digital camera is in a bulb mode, in which said exposure operation continues as long as said release button is held down.

7. The digital camera according to claim 1, further comprising a remote-control signal receiver which receives a remote control signal transmitted from a remote controller provided independently of said digital camera,
   wherein said battery checking device performs said battery check process during said exposure operation when said digital camera is in a remote-control bulb mode, in which said exposure operation continues as long as said remote-control signal receiver receives said remote control signal.

8. The digital camera according to claim 1, wherein said predetermined voltage level is determined by determining a battery type of a battery via a difference in voltage between said battery under a loaded state and said battery under a non-loaded state.

9. A digital camera, comprising:
   an image pickup device which converts incident light of an object image into an electrical signal during an exposure operation;
   a processor which captures said electrical signal, and thereafter generates a digital image from said electrical signal;
   a battery checking device which performs a battery check process for determining whether a battery voltage of said digital camera is lower than a predetermined voltage level; and
   a controller which forcibly terminates said exposure operation when said battery checking device determines that said battery voltage drops below said predetermined voltage level during said exposure operation, and subsequently makes said processor start capturing said electrical signal in order to generate a backup digital image,
wherein said battery checking device performs said battery check process during exposure at a shutter speed one of equal to and slower than a flash sync speed, and does not perform said battery check process during exposure at a shutter speed faster than said flash sync speed.

10. The digital camera according to claim 9, further comprising an indicator on which at least one of said digital image and a determined result of said battery checking device are indicated,
wherein said backup digital image and an underexposure warning indication are both indicated on said indicator in the case where said exposure operation is forcibly terminated.

11. The digital camera according to claim 10, further comprising a warning device which warns a user that said exposure operation is forcibly terminated due to a shortage of said battery voltage and that said backup digital image is underexposed, in the case where said exposure is forcibly terminated.

12. The digital camera according to claim 9, further comprising:
an inverse calculating device for calculating back an amount of underexposure with respect to a correct exposure from a timing of said forced termination of said exposure operation and a optimum shutter speed; and
a data storing device for storing said backup digital image and corresponding data of said amount of underexposure.

13. The digital camera according to claim 12, wherein said backup digital image is visually indicated on an indicator together with said corresponding data of said amount of underexposure.

14. The digital camera according to claim 9, further comprising a release button which starts said exposure operation upon being depressed,
wherein said battery checking device performs said battery check process during said exposure operation when said digital camera is in a bulb mode, in which said exposure operation continues as long as said release button is held down.

15. The digital camera according to claim 9, further comprising a remote-control signal receiver which receives a remote control signal transmitted from a remote controller provided independently of said digital camera,
wherein said battery checking device performs said battery check process during said exposure operation when said digital camera is in a remote-control bulb mode, in which said exposure operation continues as long as said remote-control signal receiver receives said remote control signal.

16. The digital camera according to claim 9, wherein said predetermined voltage level is determined by determining a battery type of a battery via a difference in voltage between said battery under a loaded state and said battery under a non-loaded state.

* * * * *